United States Patent [19]
Barton

[11] Patent Number: 5,913,524
[45] Date of Patent: Jun. 22, 1999

[54] CHUCK WITH GRIPPING MECHANISM STOP

[75] Inventor: Christopher B. Barton, Seneca, S.C.

[73] Assignee: Power Tool Holders, Inc., Wilmington, Del.

[21] Appl. No.: 08/947,268

[22] Filed: Oct. 8, 1997

[51] Int. Cl.[6] .................................................. B23B 31/12
[52] U.S. Cl. ............................ 279/62; 279/48; 279/52; 279/56; 279/59; 279/69; 279/123; 279/902
[58] Field of Search ................................. 279/47–49, 52, 279/53, 56, 59–65, 69, 70, 123, 114–116, 902

[56] References Cited

U.S. PATENT DOCUMENTS

| 2,075,031 | 3/1937 | Emrick | 279/63 |
| 4,775,159 | 10/1988 | Manshitz | 279/62 |

FOREIGN PATENT DOCUMENTS

| 3628798 | 3/1988 | Germany | 279/62 |

*Primary Examiner*—Steven C. Bishop
*Attorney, Agent, or Firm*—Dority & Manning, P.A.

[57] ABSTRACT

A chuck for use with a manual or powered driver having a drive shaft is provided. A generally cylindrical body has a forward section and a rearward section, the rearward section adapted to mate with the drive shaft of the driver. A gripping mechanism is actuatable to a closed position in which the gripping mechanism axially and rotationally retains a tool with respect to the body and to an open position in which the gripping mechanism does not so retain a tool. An annular nut is disposed about the body and has a threaded portion in threaded engagement with the gripping mechanism so that rotation of the nut about the body in a closing direction actuates the gripping mechanism to the closed position and rotation of the nut in an opening direction, opposite the closing direction, actuates the gripping mechanism to an open position. One of the nut and the gripping mechanism includes a rotational stop which, when the gripping mechanism reaches a predetermined position while being actuated by rotation of the nut in the opening direction, abuts the other of the nut and the gripping mechanism in a rotational direction with respect to the axis of the body to oppose further rotation of the nut in the opening direction.

21 Claims, 6 Drawing Sheets

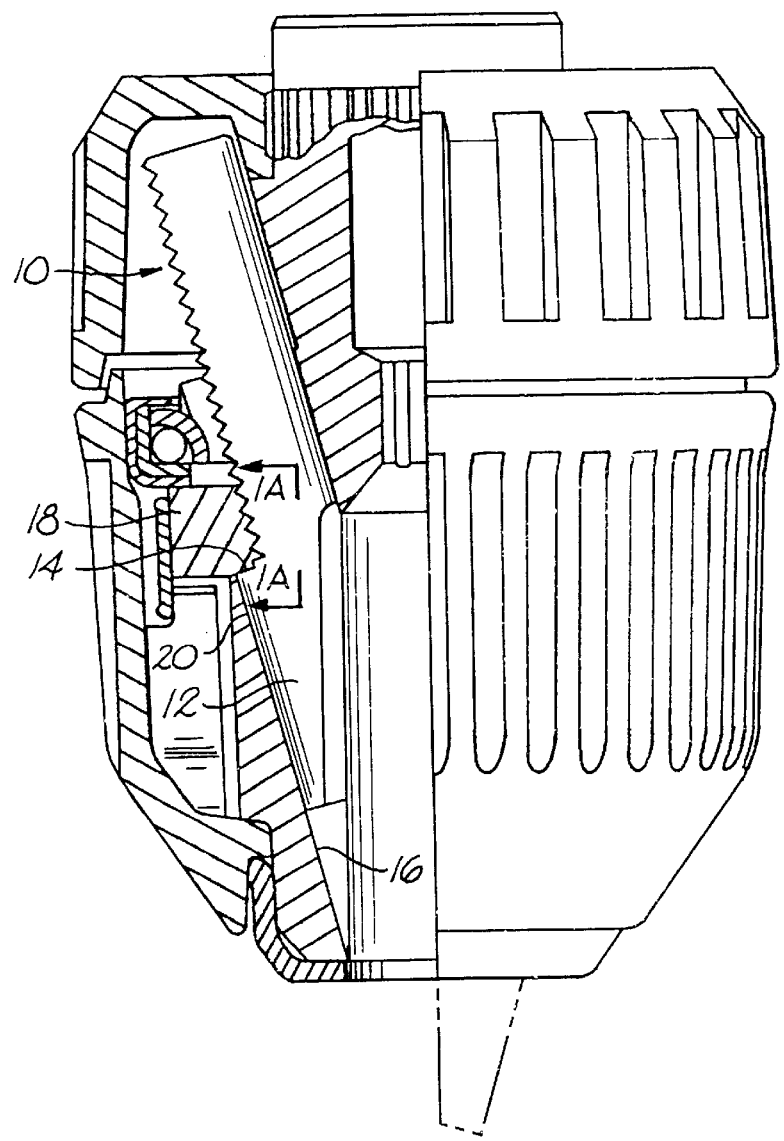
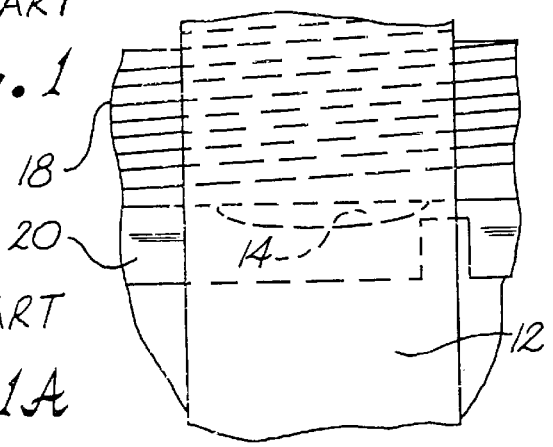
PRIOR ART
Fig. 1
PRIOR ART
Fig. 1A

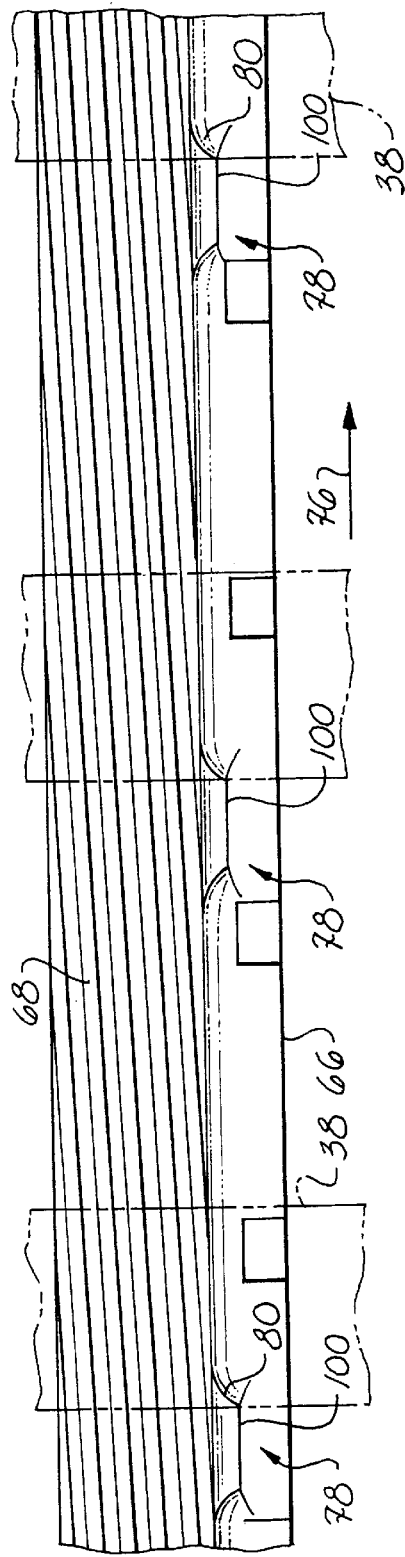
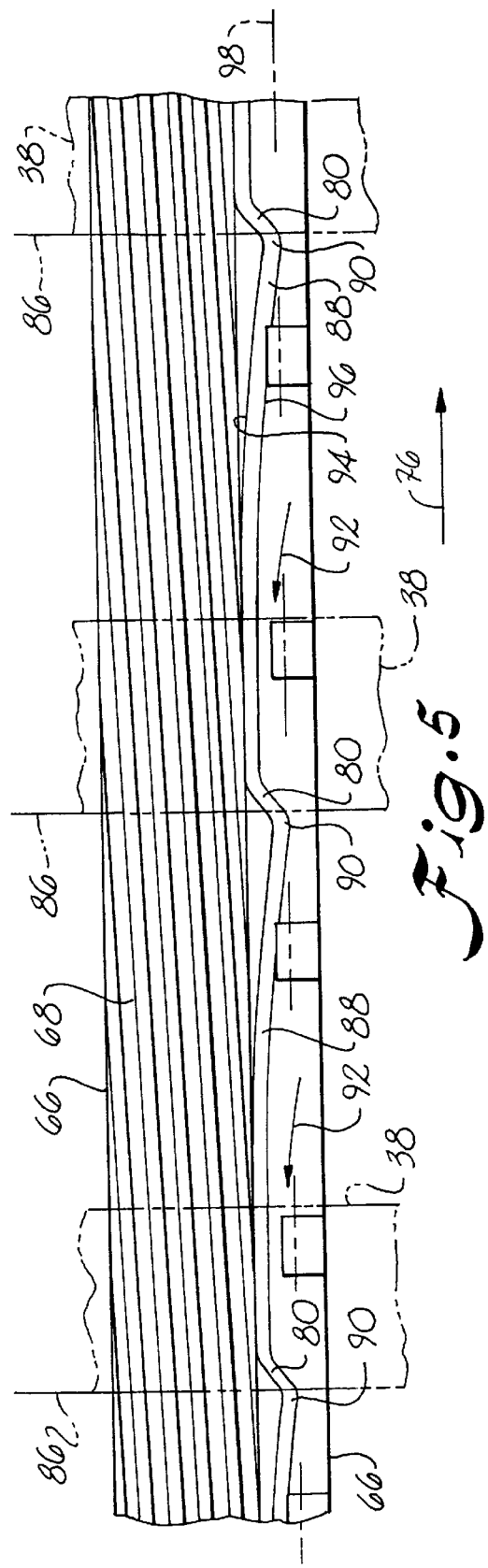

CHUCK WITH GRIPPING MECHANISM STOP

BACKGROUND OF THE INVENTION

The present invention relates generally to chucks for use with drills or with electric or pneumatic power drivers. More particularly, the present invention relates to a chuck of the keyless type which may be tightened or loosened by hand.

Both hand and electric or pneumatic tool drivers are well known. Although twists drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore or any other suitable means.

A variety of chuck types have been developed in which a gripping mechanism is actuated by relative rotation between a chuck body and an annular nut. In an oblique jawed chuck, for example, a body member includes three passageways disposed approximately 120° apart from each other. The passageways are configured so that their center lines meet at a point along the chuck axis forward of the chuck body. The gripping mechanism includes three jaws constrained by and movable in the passageways to grip a cylindrical tool shank disposed approximately along the chuck center axis. The nut rotates about the chuck's center and engages threads on the jaws so that rotation of the nut moves the jaws in either direction in the passageways. The body and nut are configured so that rotation of the nut in one direction (the closing direction) with respect to the body forces the jaws into gripping relationship with the tool shank, while rotation in the opposite direction (the opening direction) releases the gripping relationship. Such a chuck may be keyless if it is rotated by hand. One example of such a chuck is disclosed in U.S. Pat. No. 5,125,673 entitled "Non-impact Keyless Chuck," commonly assigned to the present assignee and the entire disclosure of which is incorporated by reference herein. Various configurations of keyless chucks are known in the art and are desirable for a variety of applications.

In chucks where the gripping mechanism includes jaws driven by relative rotation between the nut and the body, the jaws include a threaded portion cut into the generally cylindrical jaws. Referring to the prior art illustration of FIG. 1, threaded portion 10 is cut into a jaw 12, leaving a generally flat surface 14 at the forward edge of the threaded portion. Jaws 12 are disposed in respective passageways 16 and are in threaded engagement with a nut 18 so that rotation of nut 18 drives jaws 12 axially in passageways 16, depending on the rotational direction of the nut. Referring to FIGS. 1 and 1A, when the nut 18 is rotated in the opening direction so that the jaws are driven to their fully retracted position (a position where the tool engaging portions of the jaws are drawn radially outward from the chuck axis a distance greater than the radius of the largest cylindrical tool the chuck is designed to accommodate), flat surfaces 14 axially abut an opposing flat surface 20 of nut 18. Further rotation of nut 18 increases the frictional force between surfaces 14 and 20 until further rotation in the opening direction is inhibited. Frictional forces also resist rotation of the nut in the closing direction, however, and an operator must overcome these forces if the chuck is to be closed to grip a tool.

SUMMARY OF THE INVENTION

The present invention recognizes and addresses the foregoing considerations, and others, of prior art constructions and methods.

Accordingly, it is an object of the present invention to provide an improved chuck.

It is another object of the present invention to provide a chuck having an improved stopping mechanism to stop actuation of the gripping mechanism in an open position.

These and other objects are achieved by a chuck for use with a manual or powered driver having a drive shaft. The chuck comprises a generally cylindrical body having a forward section and a rearward section. The rearward section is adapted to mate with the driver drive shaft. A gripping mechanism is actuatable to a closed position in which the gripping mechanism axially and rotationally retains a tool with respect to the body and to an open position in which the gripping mechanism does not so retain a tool. An annular nut is disposed about the body and has a threaded portion in threaded engagement with the gripping mechanism so that rotation of the nut about the body in a closing direction actuates the gripping mechanism to the closed position and rotation of the nut in an opening direction, opposite the closing direction, actuates the gripping mechanism to an open position. The nut or the gripping mechanism includes a rotational stop which, when the gripping mechanism reaches a predetermined position while being actuated by rotation of the nut in the opening direction, abuts the other of the nut and the gripping mechanism in a rotational direction with respect to the axis of the body to oppose further rotation of the nut in the opening direction.

In one preferred embodiment, the gripping mechanism comprises a plurality of jaws slidably positioned in angularly disposed passageways in the body. Each jaw includes a threaded portion on one side thereof in threaded engagement with the nut so that rotation of the nut actuates the jaws axially in the passageways. A shoulder forward of the jaw threads on each jaw extends radially outward of the jaw threaded portion. The nut includes at least one rotational stop having a stop face extending axially forward of the nut threaded portion with respect to the body and disposed radially outward of the jaw threaded portion, and radially inward of the outwardmost extent of the jaw shoulder.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the accompanying figures, in which:

FIG. 1 is a longitudinal view, partly in section, of a chuck constructed as in the prior art with a nut actuating a plurality of jaws;

FIG. 1A is a partial cross-sectional view taken along the line 1A—1A in FIG. 1;

FIG. 3 is a plan view of the inner diameter of a nut, viewed as if the nut were cut and opened flat as in FIG. 5, of a chuck constructed in accordance with an embodiment of the present invention;

FIG. 5 is a plan view of the inner diameter of the nut of the chuck as in FIG. 2 taken along the line 5—5 of FIG. 4;

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will apparent to those skilled in the art that modifications and variations can be made to the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to the figures, a presently preferred embodiment of the present invention is illustrated in the form of an oblique jawed chuck. It should be understood, however, that this illustration is provided by way of explanation of the invention only and that the invention is applicable to any suitable chuck in which a gripping mechanism is actuated through relative rotation of a nut and a chuck body.

Figure 2:
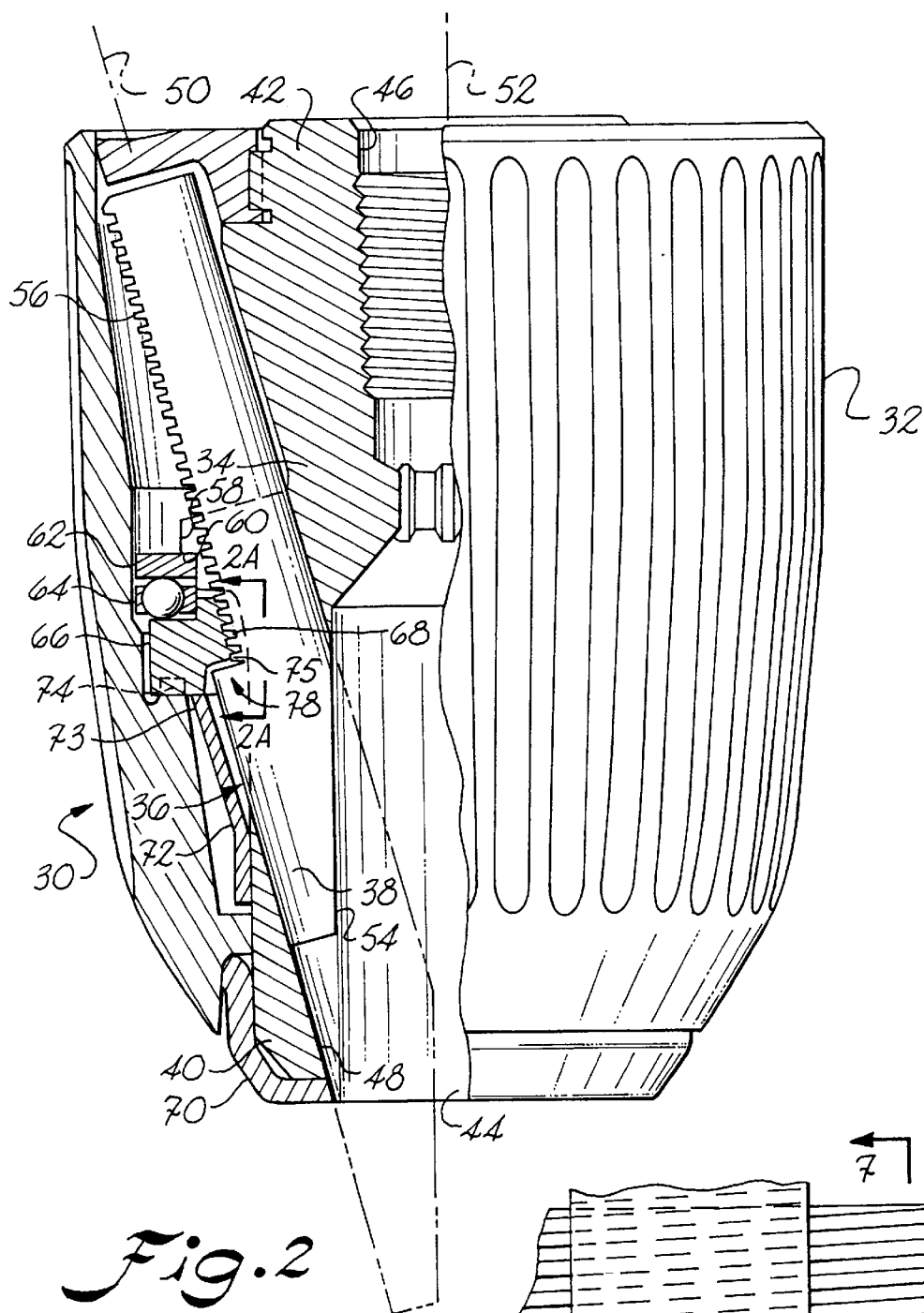
FIG. 2 is a longitudinal view, partly in section, of a chuck in accordance with an embodiment of the present invention.
Figure 2A:
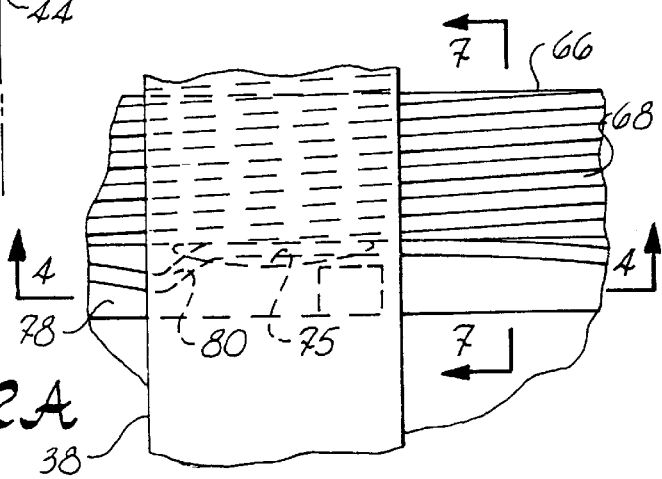
FIG. 2A is a partial cross-sectional view taken along the line 2A—2A of FIG. 2.

Referring to FIG. 2, a chuck 30 includes a sleeve 32, a body 34 and a gripping mechanism 36. In this embodiment, gripping mechanism 36 includes jaws 38. Body 34 is generally cylindrical in shape and comprises a nose or forward section 40 and a tail or rearward section 42. An axial bore 44 is formed in forward section 40. Axial bore 44 is dimensioned somewhat larger than the largest tool shank that the chuck is designed to accommodate. A threaded bore 46 is formed in tail section 42 and is of a standard size to mate with the drive shaft of a powered or hand driver, for example a power drill having a spindle. The bores 44 and 46 may communicate at a central region of body 34. While a threaded bore 46 is illustrated, such bore could be replaced with a tapered bore of a standard size to mate with a tapered drive shaft or with any suitable connection mechanism.

Passageways 48 are formed in body 34 to accommodate each jaw 38. Three jaws 38 are employed, and each jaw is separated from the adjacent jaw by an arc of approximately 120°. The axes 50 of the passageways 48 and the jaws 38 are angled with respect to the chuck axis 52 and intersect the chuck axis at a common point ahead of chuck body 34. Each jaw 38 has a tool engaging portion 54, which is generally parallel to chuck axis 52, on one surface and threads 56 on its opposite or outer surface. Threads 56 may be constructed in any suitable type and pitch.

Body 34 includes a thrust ring member 58 which, in a preferred embodiment, may be integral with the body. In an alternate embodiment, thrust ring 58 may be a separate component from the body member. Thrust ring 58 may also include a ledge portion 60, to receive a bearing assembly, and a plurality of jaw guideways formed around its circumference to permit retraction of the jaws therethrough. In the embodiment illustrated in FIG. 2, the bearing assembly includes a washer 62 and a caged roller bearing 64.

An annular nut 66 is a one piece nut which includes threads 68 for mating with threads 56 on jaws 38. Nut 66 is positioned about the body in engagement with the jaw threads so that when the nut is rotated with respect to body 16, the jaws will be advanced or retracted.

The outer circumferential surface of sleeve 32 may be knurled or may be provided with longitudinal ribs or any other configuration to enable a user to grip it securely. The sleeve may be fabricated from a structural plastic such as polycarbonate, a filled polypropylene, for example a glass filled polypropylene, or a blend of structural plastic materials. Other composite materials such as, for example, graphite filled polymerics may be suitable in certain environments. As should be appreciated by one skilled in the art, the materials from which the chuck's sleeve is fabricated will depend on the end use of the chuck, and the above discussion is provided by way of example only.

Figure 4:
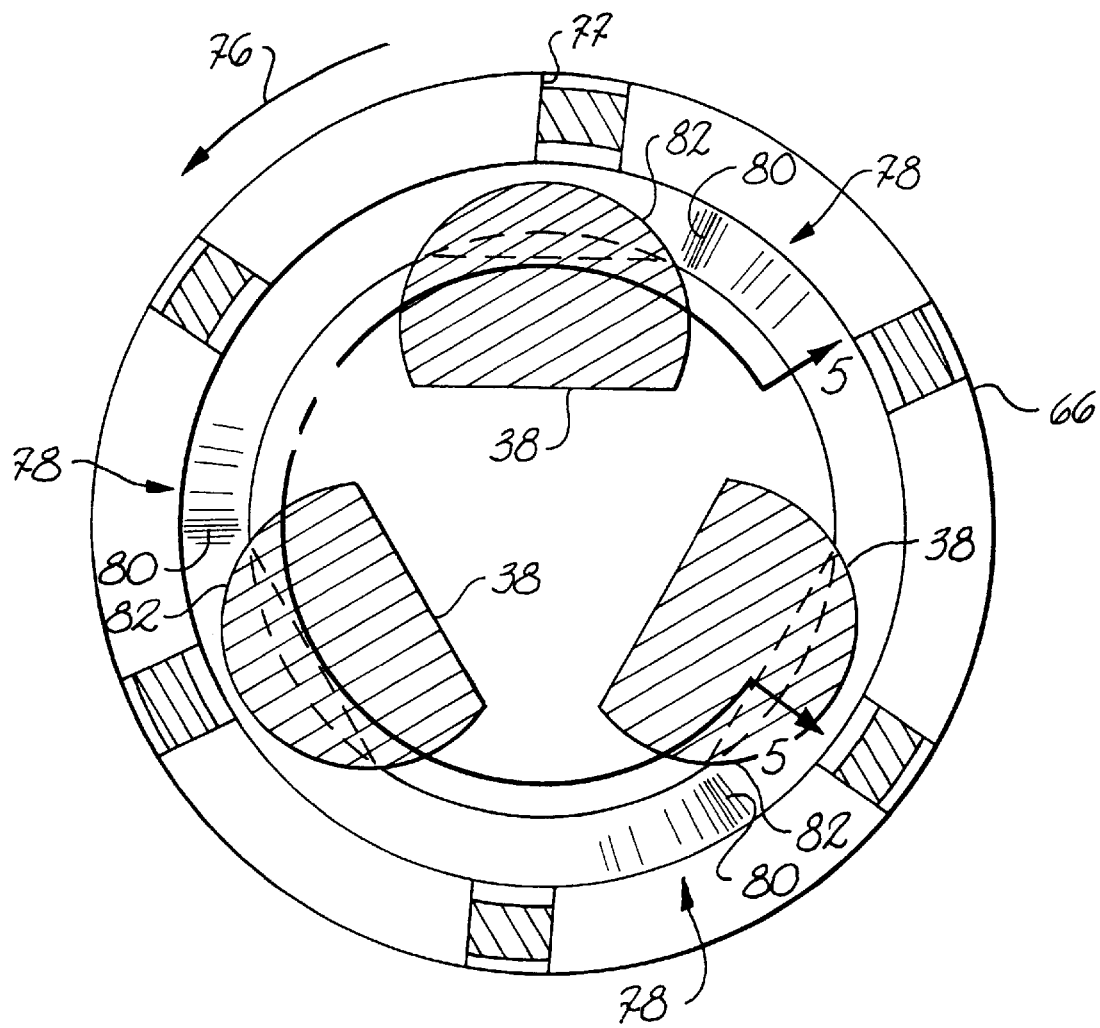
FIG. 4 is a cross-sectional view of the chuck as in FIG. 2 taken along the line 4—4 of FIG. 2A.

Sleeve 32 is axially secured with respect to the body by nosepiece 70 which is pressed onto forward section 40 of body 34. Nut 66 is maintained in place by retaining ring 72. Retaining ring 72 is an annular cone that is pressed onto forward section 40 and that engages nut 66 at 73. Drive dogs 74 are received by slots 77 (FIG. 4) to rotationally fix sleeve 32 to nut 66.

Because sleeve 32 is rotationally fixed to nut 66, rotation of sleeve 32 with respect to body 34 also rotates nut 66 with respect to the body. As noted above, rotation of nut 66 moves jaws 38 axially through the passageways due to the engagement of the nut threads and the jaw threads. The direction of the axial movement of the jaws depends on the rotational direction of the sleeve and nut with respect to the body. If a tool, such a drill bit, is inserted into bore 44, the sleeve and nut may be rotated about chuck axis 52 in a closing direction so that jaws 38 move to a closed position wherein tool engaging portions 54 grippingly engage the tool. Rotation about axis 52 in the opposite (opening) direction moves the jaws axially rearward out of the closed position to an open position.

Referring to FIGS. 2, 2A, 4 and 6, nut 66 includes three stops 78 axially forward of nut threads 68 and disposed angularly equidistantly about the inner diameter of the nut. As nut 66 is rotated in the opening direction 76 (FIG. 4), each jaw 38 is drawn axially rearward along its axis 50 until its jaw shoulder 75 reaches nut 66. When the jaws reach this position, in this case a fully retracted position, each stop simultaneously engages a respective jaw 38. Since passageways 48 constrain jaws 38 from rotation with respect to the body about chuck axis 52, the jaws oppose further opening rotation of the nut.

More specifically, each stop 78 includes a stop face 80 extending axially forward (with respect to the chuck body) of the nut threads and which passes over the jaw threads as the nut is rotated. When the jaw shoulders 75 reach nut 66, however, further rotation of nut 66 in opening direction 76 brings stop faces 80 into engagement with the jaws. In particular, the stop faces abut rotational leading edges 82 of jaws 38, and further rotation of nut 66 in opening direction 76 is inhibited.

Figure 6:
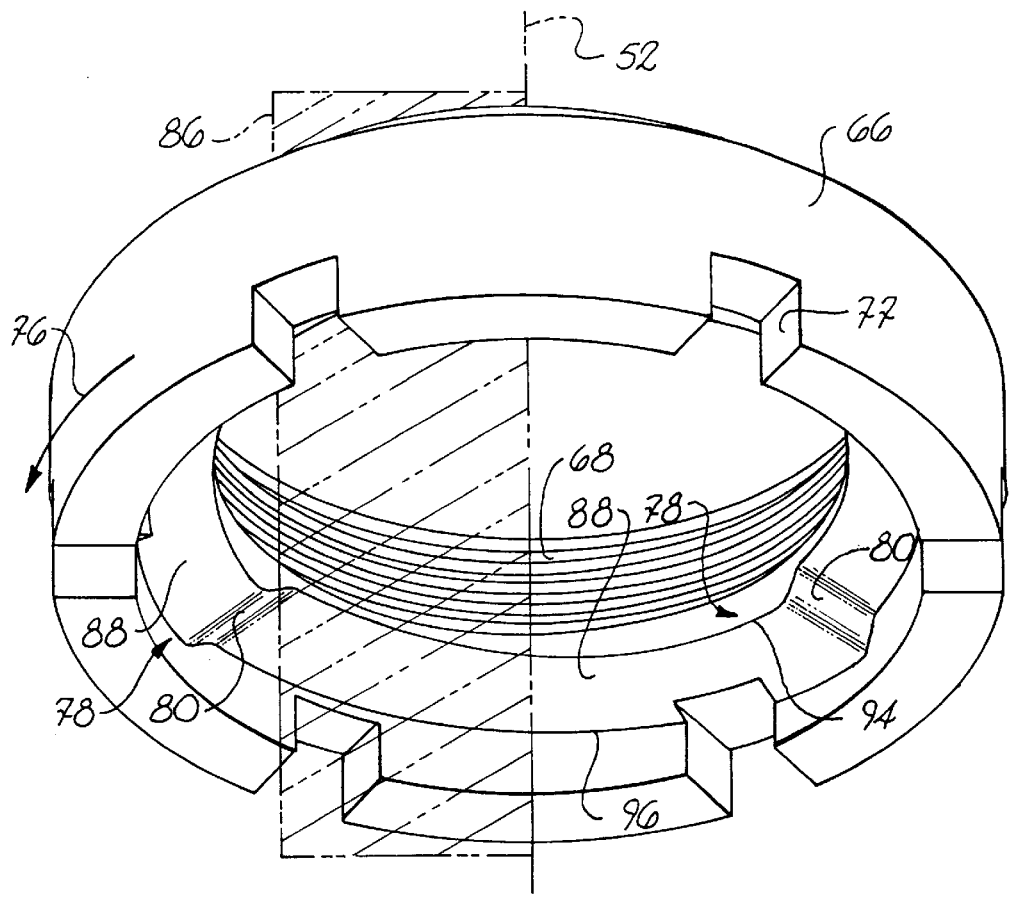
FIG. 6 is a perspective view of a nut of a chuck constructed in accordance with the present invention.
Figure 8:
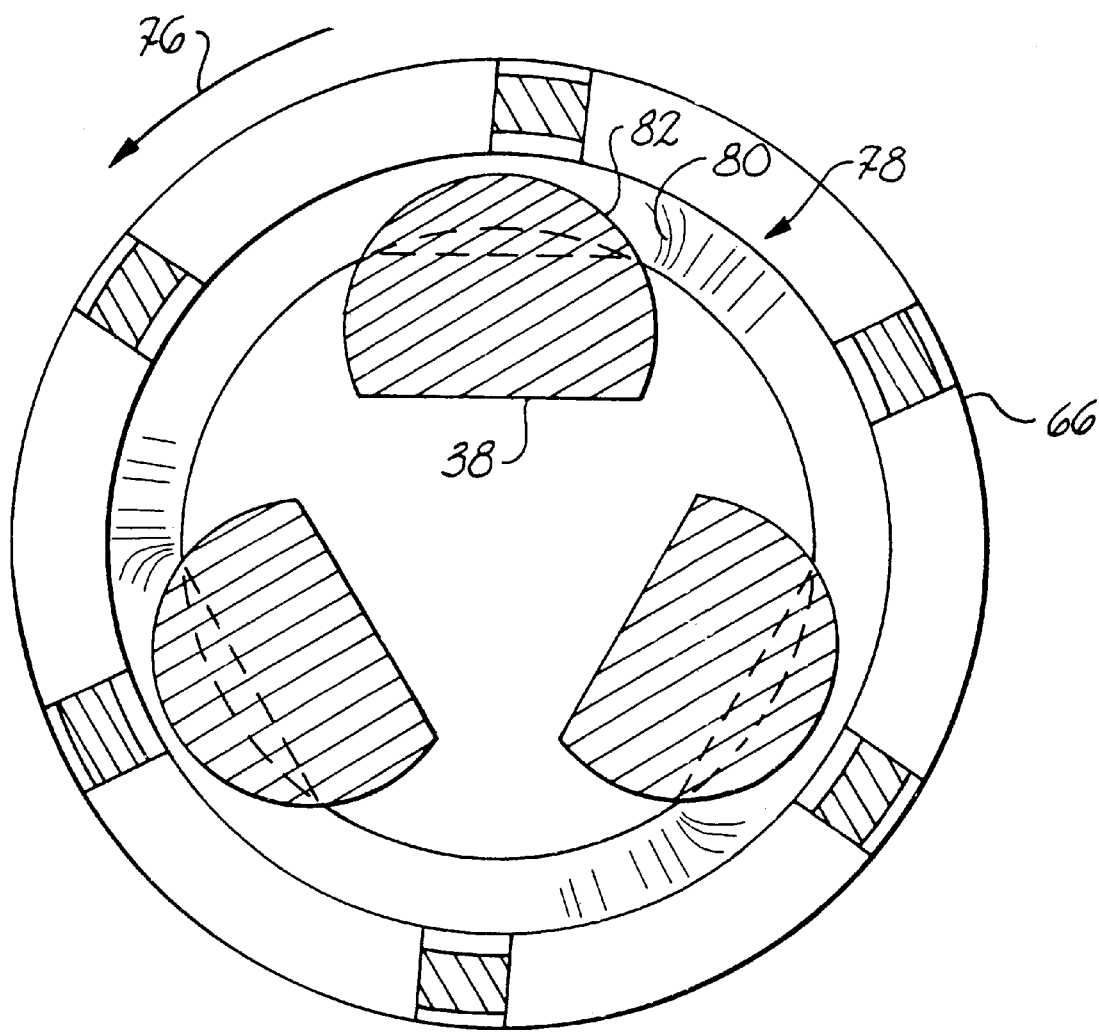
FIG. 8 is a cross-sectional view of a chuck constructed in accordance with an embodiment of the present invention providing a front view of the annular nut, Repeat use of reference characters in the present specification and drawings is intended to represent the same or analogous features or elements of the invention.

Referring to FIGS. 5 and 6, each stop face 80 is slightly angled with respect to a plane 86 including axis 52 of nut 66 and chuck 30. It should be understood, however, that the stop faces may be disposed in any suitable manner so that, when they are received by leading edges 82, further opening rotation of nut 66 is inhibited without significant frictional lock between the nut and the jaws. For example, stop faces 80 may be disposed parallel to plane 86. Further, as illustrated in FIG. 8, the stop faces may be curved so that they conform to the curved surfaces of jaw leading edges 82, thereby increasing the surface area which rotationally abut the jaws.

Referring to FIGS. 5 and 6, each stop 78 forms a shoulder with a stop face 80 on one side and a sloped portion 88 extending rearward from the stop face with respect to opening direction 76. The slope of rear portions 88 from the top of one stop face 80 to the foot of the following stop face avoids a significant frictional lock between the nut and the jaws by accommodating axial movement of the jaw leading edges as the nut rotates. For example, assume that rotation of nut 66 in opening direction 76 brings leading edges 82 (FIG. 4) of jaws 38 to the tops 90 of stop faces 80 so that the stop faces just clear the leading edges. Further opening rotation of the nut draws the leading edges axially rearward into the passageways toward thread 68, causing the leading edges to follow a sloped path, indicated by arrows 92, with respect to the nut. Sloped surfaces 88 approximate this path to permit the nut's continued rotation until the following stop faces 80 rotationally engage the leading edges.

The angle, or pitch, of the sloped paths of the jaw leading edges, indicated by arrows 92, depends upon the pitch of the nut threads and jaw threads and the diameter of the nut. The angle of the slope of surfaces 88 is preferably equal to or greater than the angle of paths 92. For example, the slope of surfaces 88 may be approximately 1° or greater with respect to a plane 98 normal to the chuck axis, where the nut thread pitch is 1°, and in one preferred embodiment is between approximately 2° and 5°.

Figure 7:
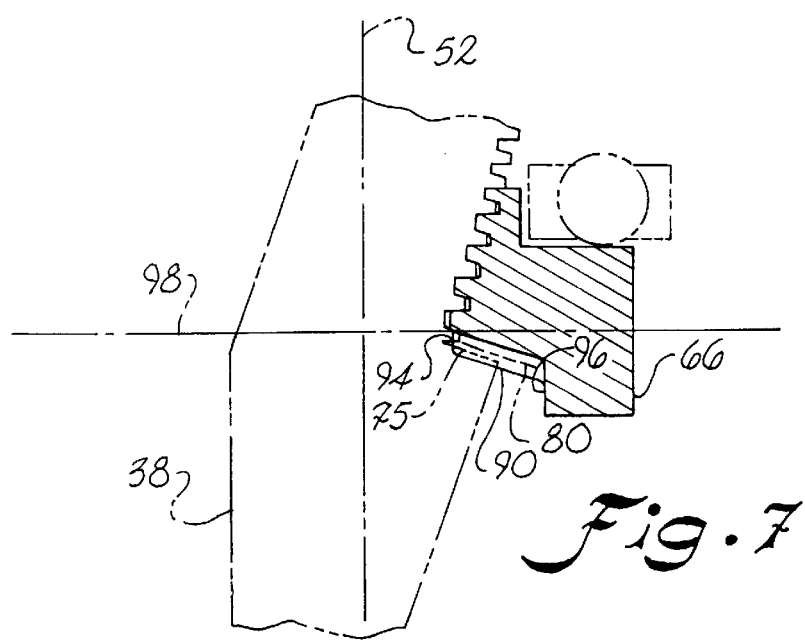
FIG. 7 is a partial cross-sectional view of the chuck as in FIG. 2, taken along the lines 7—7 of FIG. 2A.

The surfaces of stop faces 80 and sloped portions 88 extend from an inner diameter 94 to an outer diameter 96. Referring to FIG. 7, the surfaces are sloped as they extend from the inner diameter to the outer diameter with respect to plane 98, the slope being approximately equal to the slope of jaw shoulder 75.

Another embodiment of the present invention, illustrated in FIG. 3, includes stops 78 having curved stop faces 80 to receive leading edges 82 (FIG. 4) of jaws 38. Rather than a sloped rear portion, a relatively short plateau 100 extends rearward from each stop face 80 with respect to opening direction 76. Plateaus 100 are relatively short to avoid the faces of jaw shoulders 75 (FIG. 2) as they move rearward and toward the following stop face 80.

While one or more preferred embodiments of the present invention are described above, it should be appreciated that various suitable embodiments are encompassed by the present invention. In one preferred embodiment, for example, the nut includes a single stop having a stop face and a rotationally rearward sloped surface. The slope of the rearward sloped surface approaches, but is not less than, the pitch of the nut. Accordingly, such modification and variations to the present invention may be practiced by those of ordinary skill in the art without parting from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is provided by way of example only, and is not intended to be limitative of the invention so further described in such appended claims.

What is claimed is:

1. A chuck for use with a manual or powered driver having a drive shaft, said chuck comprising:
   a generally cylindrical body, said body having a forward section and a rearward section, said rearward section adapted to mate with said drive shaft of said driver;
   a gripping mechanism actuatable to a closed position in which said gripping mechanism axially and rotationally retains a tool with respect to said body and to an open position in which said gripping mechanism does not so retain a tool; and
   an annular nut disposed about said body and having a threaded portion in threaded engagement with said gripping mechanism so that rotation of said nut about said body in a closing direction actuates said gripping mechanism to said closed position and rotation of said nut in an opening direction, opposite said closing direction, actuates said gripping mechanism to said open position,
   wherein one of said nut and said gripping mechanism includes a rotational stop which, when said gripping mechanism reaches a predetermined position while being actuated by rotation of said nut in said opening direction, abuts the other of said nut and said gripping mechanism in a rotational direction with respect to the axis of said body to oppose further rotation of nut in said opening direction.

2. The chuck as in claim 1, wherein said nut includes at least one said stop comprising a shoulder having a stop face extending axially outward of said nut threaded portion with respect to said body to abut a rotationally leading edge of a stop receiving portion of said gripping mechanism when said gripping mechanism reaches said predetermined position to inhibit further rotation of said nut in said opening direction.

3. The chuck as in claim 2, wherein said stop face extends axially forward of said nut threaded portion.

4. The chuck as in claim 1, including a generally cylindrical sleeve being received over said body so that said sleeve is rotatable relative to said body, said sleeve being in operative communication with said nut so that rotation of said sleeve about said body rotates said nut.

5. The chuck as in claim 1, wherein said forward section of said body has an axial bore formed therein and a plurality of angularly disposed passageways formed therethrough and intersecting said axial bore in said forward section.

6. The chuck as in claim 5, wherein said gripping mechanism includes a plurality of jaws, a said jaw being positioned slidably in each of said angularly disposed passageways with respect to the passageway axis and so that said passageways inhibit movement of said jaws with respect to said body about said body axis, each of said jaws having a jaw face formed on one side thereof and threads formed on the opposite side thereof.

7. The chuck as in claim 6, wherein said nut includes at least one said stop comprising a shoulder having a stop face extending axially, with respect to said body, outward of said nut threaded portion and wherein each said jaw includes a stop receiving portion that abuts said stop face in a rotational direction with respect to said body axis to inhibit further rotation of said nut in said opening direction.

8. The chuck as in claim 7, wherein said passageways are disposed angularly equidistantly about said body and wherein said nut includes a number of said stops equal to the number of said passageways and disposed angularly equidistantly about said nut.

9. The chuck as in claim 3, wherein said at least one stop includes a sloped rear portion extending rearward, with respect to said opening direction, from said stop face and toward said nut threaded portion.

10. The chuck as in claim 9, wherein said sloped rear portion extends from said stop face toward said nut threaded portion at a substantially constant slope.

11. The chuck as in claim 10, wherein said sloped rear portion is disposed at an angle of at least 1° with respect to a plane normal to the axis of said nut.

12. The chuck as in claim 10, wherein said sloped rear portion is disposed at an angle between 2° and 5° with respect to a plane normal to the axis of said nut.

13. A chuck for use with a manual or powered driver having a drive shaft, said chuck comprising:

a generally cylindrical body, said body having a forward section and a rearward section, said rearward section adapted to mate with said drive shaft of said driver and said forward section having an axial bore formed therein and a plurality of angularly disposed passageways formed therethrough and intersecting said axial bore in said forward section;

a plurality of jaws, a said jaw being positioned slidably in each of said angularly disposed passageways with respect to the passageway axis and so that said passageways inhibit movement of said jaws with respect to said body about the axis of said body, each of said jaws having a jaw face formed on one side thereof and threads formed on the opposite side thereof;

an annular nut disposed about said body and having a threaded portion in threaded engagement with said jaw threads so that rotation of said nut about said body in a closed position actuates said jaws to a closed position in which said jaws axially and rotationally retain a tool with respect to said body and rotation of said nut in an opening direction, opposite said closing direction, actuates said jaws to an open position in which said jaws do not so retain a tool; and a generally cylindrical sleeve being received over said body so that said sleeve is rotatable relative to said body, said sleeve being in operative communication with said nut so that rotation of said sleeve rotates said nut, wherein said nut includes at least one rotational stop which, when said jaws reach a predetermined position while being actuated by rotation of said nut in said opening direction, abuts a said jaw in a rotational direction with respect to said body axis to oppose further rotation of said nut in said opening direction.

14. The chuck as in claim 13, wherein said at least one stop comprises a stop face extending axially, with respect to said body, forward of said nut threaded portion.

15. The chuck as in claim 14, wherein each said jaw includes a shoulder forward of said jaw threads with respect to said body when said jaw is operatively disposed in its respective said passageway, said shoulder extending radially outward of said jaw threads with respect to the axis of said respective passageway.

16. The chuck as in claim 13, wherein said passageways are disposed angularly equidistantly about said body and wherein said nut includes a number of said stops equal to the number of said passageways and disposed angularly equidistantly about said nut.

17. The chuck as in claim 16, wherein said body includes three said passageways.

18. The chuck as in claim 14, wherein said at least one stop includes a sloped rear portion extending rearward, with respect to said opening direction, from said stop face and toward said nut threaded portion.

19. The chuck as in claim 18, wherein said sloped rear portion extends from said stop face toward said nut threaded portion at a substantially constant slope.

20. The chuck as in claim 19, wherein said sloped rear portion is disposed at an angle of at least 1° with respect to a plane normal to the axis of said nut.

21. A chuck for use with a manual or powered driver having a drive shaft, said chuck comprising:

a generally cylindrical body, said body having a forward section and a rearward section, said rearward section adapted to mate with said drive shaft of said driver and said forward section having an axial bore formed therein and a plurality of angularly disposed passageways formed therethrough and intersecting said axial bore in said forward section;

a plurality of jaws, a said jaw being positioned slidably in each of said angularly disposed passageways with respect to the passageway axis and so that said passageways inhibit movement of said jaws with respect to said body about the axis of said body, each of said jaws having a jaw face formed on one side thereof and threads formed on the opposite side thereof, and a shoulder forward of said jaw threads with respect to said body when said jaw is operatively disposed in its respective said passageway, said shoulder extending radially outward of said jaw threaded portion with respect to the axis of said respective passageway;

an annular nut disposed about said body and having a threaded portion in threaded engagement with said jaw threads so that rotation of said nut about said body in a closed position actuates said jaws to a closed position in which said jaws axially and rotationally retain a tool with respect to said body and rotation of said nut in an opening direction, opposite said closing direction, actuates said jaws to an open position in which said jaws do not so retain a tool; and a generally cylindrical sleeve being received over said body so that said sleeve is rotatable relative to said body, said sleeve being in operative communication with said nut so that rotation of said sleeve rotates said nut, wherein said nut includes at least one rotational stop having a stop face extending axially forward of said nut threaded portion with respect to said body and disposed radially outward of said jaw threaded portion, and radially inward of the outwardmost extent of said jaw shoulder, with respect to said passageway axis so that when said nut is rotated in said opening direction a rotationally leading edge of a said jaw shoulder abuts said stop face when said jaws reach said predetermined position.

* * * * *